T. L. BURTON.
BRAKE RIGGING.
APPLICATION FILED JUNE 14, 1917.
1,261,486.
Patented Apr. 2, 1918.
2 SHEETS—SHEET 1.
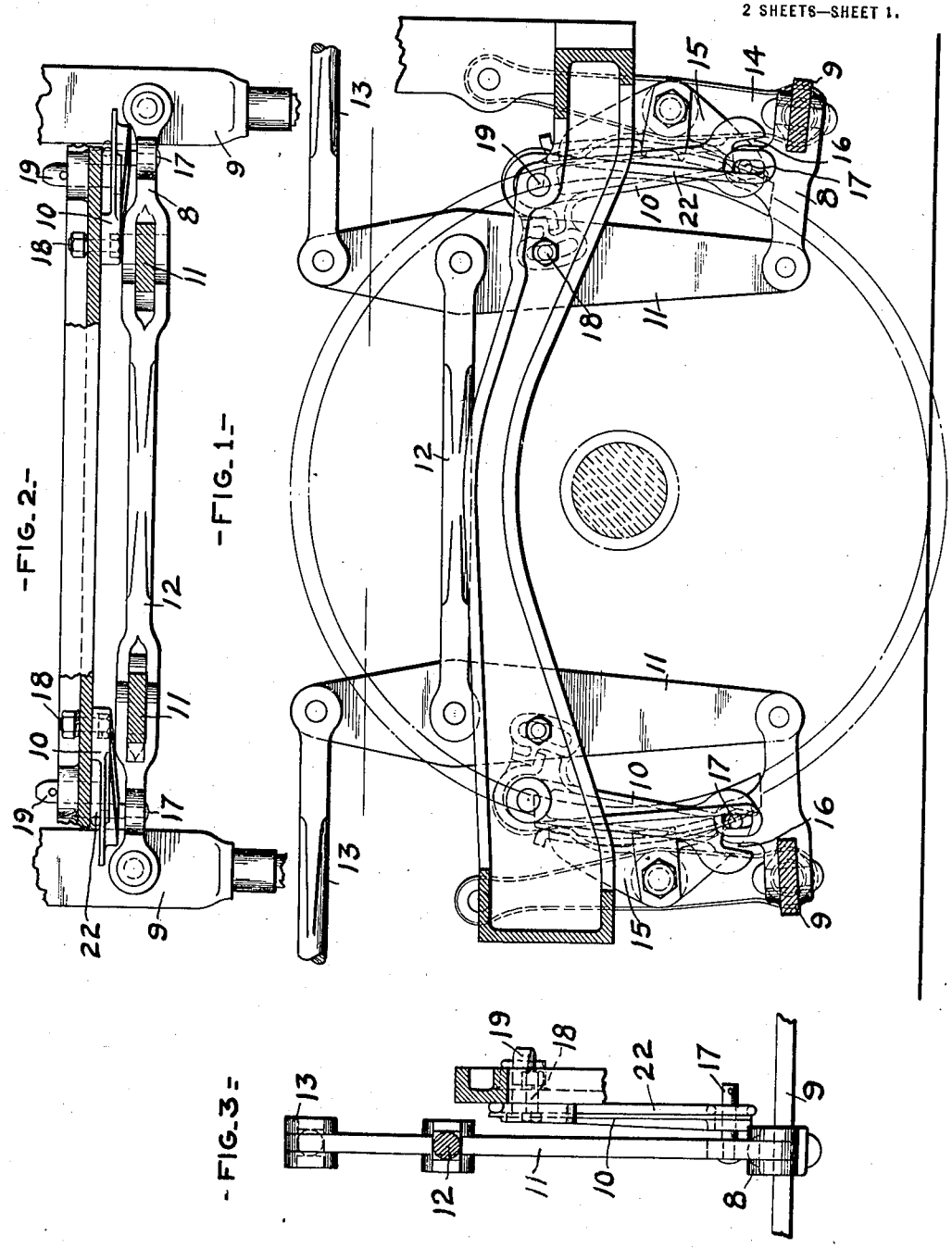
INVENTOR
Thomas L. Burton,
by Edward H. Wright T. L. BURTON.
BRAKE RIGGING.
APPLICATION FILED JUNE 14, 1917.
1,261,486.
Patented Apr. 2, 1918.
2 SHEETS—SHEET 2.
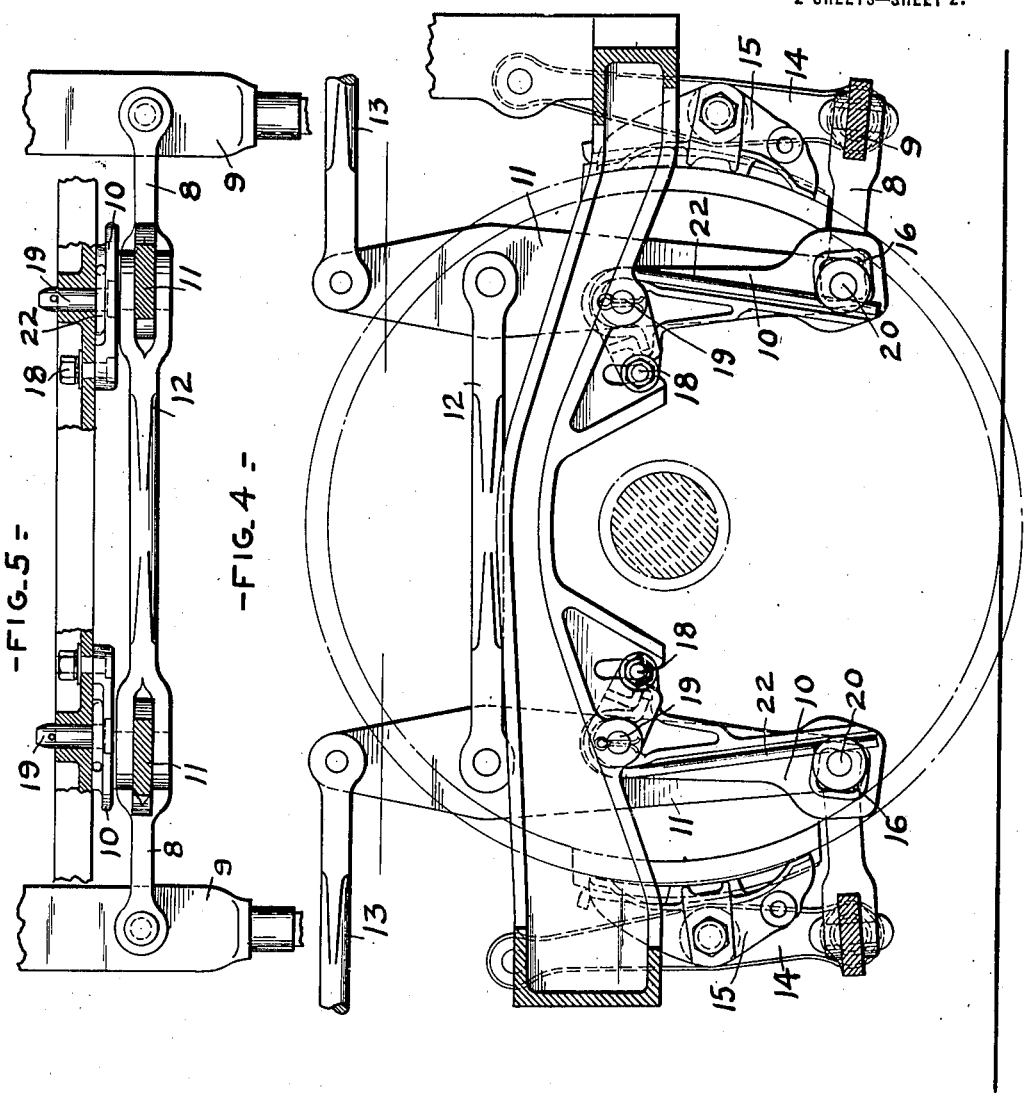
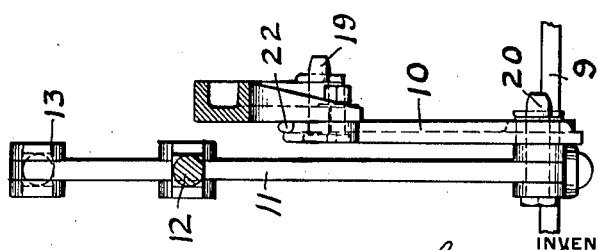
INVENTOR
Thomas L. Burton
by Edward A. Wright
Atty.

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING.

1,261,486. Specification of Letters Patent. Patented Apr. 2, 1918.

Application filed June 14, 1917. Serial No. 174,673.

*To all whom it may concern:*

Be it known that I, THOMAS L. BURTON, a citizen of the United States, residing at St. Louis, in the State of Missouri, have invented a certain new and useful Improvement in Brake-Rigging, of which improvement the following is a specification.

This invention relates to brake rigging and more particularly the release movement thereof, and has for its object to provide an improved stop device for limiting the release movement of the brake shoes, and for distributing the release action through the system of rods and levers whereby the clearance between the shoes and wheels shall be substantially uniform for all the brake shoes. Another feature comprises improved means for automatically adjusting the stop device to compensate for the wear of the brake shoes and wheels and thereby maintain a constant and uniform clearance under all conditions.

In the accompanying drawings;

Figure 1 is a longitudinal section taken between the truck wheels and showing a clasp type of brake rigging embodying my improvement;

Fig. 2, a horizontal section, with the brake shoes and hangers removed;
Fig. 3, a vertical transverse section taken across the frame between truck levers, and showing a truck lever and the improved stop device in end elevation; and Figs. 4, 5 and 6, views similar to Figs. 1, 2 and 3, respectively, but showing a modification.

While my improvement is adapted to be used with any of the various forms of equalized systems of brake rigging, it is herein illustrated as applied in connection with a brake rigging of the clasp brake type, in which there are brake beams, 9, at both sides of each pair of wheels, with two sets of truck levers and rods, one at each side of the truck, the truck levers, 11, being pivotally connected at their lower ends to the respective brake beams, and connected by rods, 12, at their intermediate points with the levers of the same pair of wheels, and by rods, 13, at their upper ends, with the levers of an adjacent pair of wheels, except at the ends of the system where one end truck lever is connected to a pull rod connection from the brake cylinder, while the truck lever at the opposite end may be pivotally connected to the truck frame. The brake beams are suspended from the frame by hanger levers, 14, connected to the trunnions at the ends of the beams and the brake heads and shoes, 15, are mounted at an intermediate point on the hanger levers. This system constitutes one of the standard designs of clasp brake.

According to my present improvement the stop device for limiting the release movement of the brake beams and shoes, comprises a lever arm 10, pivoted at 19, on the truck frame and having a frictional engagement therewith which normally prevents movement of said arm. There is a lost motion connection between the lower end of the arm 10, and the brake beam, which allows for the normal application and release movement of the latter, and this may be provided by any suitable arrangement of coöperating lugs or projections on these parts. As shown in Figs. 1, 2 and 3, of the drawings, the lower end of the arm 10, is provided with a slotted opening 16, with a lug at either end, forming a jaw, through which extends a pin 17, mounted on the brake beam or its jaw 8, to which the truck lever is pivoted.

In the modification shown in Figs. 4, 5 and 6, the slotted opening 16, at the lower end of arm 10, is closed at the bottom and is located on the pivot pin 20, of the truck lever and brake beam jaw. This makes a simple construction and the arm also serves as a safety hanger to assist in holding up the brake beam in case of failure of the regular hanger. Any suitable means may be employed for adjusting the frictional engagement between the arm and the frame, as for instance a clamping bolt 18, mounted in one member and passing through a curved slot in the other. The nut on said bolt is screwed up tight enough to prevent movement of the pivoted arm 10, during the usual application and release movements of the rigging, but as the brake shoes and wheels wear and it is necessary for the brake shoes and beam to make a longer travel in being forced against the wheels at the time of application, the pin then engages the end of the slot 16, in the end of the arm 10 and shifts said arm upon its pivot, overcoming the frictional resistance of the clamping bolt 18. In this way the stop arm is adjusted automatically to compensate for the wear of brake shoes and wheels.

Upon release of brakes the usual release springs (not shown), operate through the system of rods and truck levers to swing the brake beams and shoes away from the wheels, and during this movement the pin carried by the brake beam travels in the slot 16, in the arm 10, without moving said arm. The slot 16 is of such length as to allow for the proper amount of clearance for the brake shoe, and if there should be a tendency during the releasing action, to swing any particular brake beam through a greater distance, the pin engages the end of the slot and limits the release movement. The lower pivot of the truck lever is thus held as a fulcrum and the releasing movement is distributed through the system of rods and levers, thus producing a substantially uniform clearance between all of the brake shoes and wheels.

If desired an individual release spring 22, may be applied to each of the arms 10, acting between the arm and the pin carried by the jaw of the brake beam. This spring tends to return the pin and brake beam from the inward limit of movement, that is, when the brake shoe is against the wheel, to the opposite limit, during the release action, and thereby effect the proper clearance for the brake shoes.

It will now be seen that my improvement operates to produce a substantially uniform clearance for all the brake shoes, and maintains the same substantially constant under all conditions of wear of the brake shoes and wheels.

Having now described my invention, what I claim as new and desire to secure by Letters Patent is:

1. In a brake rigging, the combination with brake shoes, and truck levers and rods for operating the same, of an arm pivoted on the truck frame and serving as a stop for limiting the release movement of a brake shoe, and means for exerting a frictional resistance to movement between said arm and the frame.

2. In a brake rigging, the combination with brake beams, and truck levers pivotally connected thereto, of an arm pivoted on the frame, there being a free application and release movement between the brake beam and said arm, means for exerting resistance to the movement of said arm, and coöperating projections connected with said parts for engaging each other at the limits of said free movement.

3. In a brake rigging, the combination with brake beams, and truck levers pivotally connected thereto, of an arm pivoted on the frame, and having a frictional engagement therewith, the arm and a brake beam being provided with coöperating projections for engaging each other at the limits of the normal application and release movement of said beam.

4. In a brake rigging, the combination with brake beams, and truck levers pivotally connected thereto, of an arm pivoted on the frame, the arm having a slotted opening and the brake beam carrying a pin extending into said slotted opening, and means for producing a frictional engagement between said arm and the frame.

5. In a brake rigging, the combination with brake beams having intermediate jaws, and truck levers pivoted thereto, of a stop arm pivoted on the frame and having a slotted opening, the pivot pin of said truck lever extending into said opening, and means for producing a frictional engagement between said arm and the frame.

6. In a brake rigging, the combination with brake beams, and truck levers and rods for operating the same, of a stop arm pivoted on the truck frame and having a slotted opening, a projection carried by the brake beam and extending into said slot, an individual spring mounted on said arm and tending to move said projection to the outer end of the slot, and adjustable means for producing a frictional engagement between said arm and the frame.

7. In a brake rigging, the combination with brake beams having intermediate jaws, and truck levers pivoted thereto at both sides of the truck, of stop arms pivoted on both side frames and having slotted openings closed at the bottom, and pivot pins connecting the truck levers and jaws and extending through said slotted openings at the lower ends of said arms.

In testimony whereof I have hereunto set my hand.

THOMAS L. BURTON.